(12) United States Patent
Gupta et al.

(10) Patent No.: US 10,175,977 B2
(45) Date of Patent: Jan. 8, 2019

(54) USER PROFILE BASED CODE REVIEW

(71) Applicant: International Business Machines Corporation, Armonk, NY (US)

(72) Inventors: Sachin Gupta, Bangalore (IN); Prem S. Jha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 14/932,529

(22) Filed: Nov. 4, 2015

(65) Prior Publication Data

US 2017/0123790 A1     May 4, 2017

(51) Int. Cl.
*G06F 8/71*     (2018.01)
*G06F 11/24*    (2006.01)
*G06F 11/36*    (2006.01)
*G06F 11/34*    (2006.01)

(52) U.S. Cl.
CPC ............. *G06F 8/71* (2013.01); *G06F 11/34* (2013.01); *G06F 11/3604* (2013.01); *G06F 11/3628* (2013.01)

(58) Field of Classification Search
CPC .... G06F 8/71; G06F 11/3628; G06F 11/3604; G06F 11/34
See application file for complete search history.

(56) References Cited

U.S. PATENT DOCUMENTS

| 6,883,126 | B1 * | 4/2005 | Herman | G11B 20/18 714/723 |
| 8,448,141 | B2 | 5/2013 | Blount et al. | |
| 8,595,685 | B2 | 11/2013 | Sharma et al. | |
| 8,635,598 | B2 | 1/2014 | Roberts et al. | |
| 2005/0198622 | A1 * | 9/2005 | Ahluwalia | G06F 11/3672 717/130 |
| 2007/0022321 | A1 * | 1/2007 | Chua | G06F 11/0742 714/38.1 |
| 2008/0113785 | A1 * | 5/2008 | Alderucci | G06F 21/32 463/29 |
| 2008/0295085 | A1 | 11/2008 | Rachamadugu et al. | |
| 2009/0249298 | A1 * | 10/2009 | Blount | G06F 8/70 717/125 |
| 2011/0252394 | A1 * | 10/2011 | Sharma | G06F 11/3616 717/101 |
| 2012/0324425 | A1 * | 12/2012 | Roberts | G06F 8/33 717/123 |

(Continued)

OTHER PUBLICATIONS

Mell, et al., "The NIST Definition of Cloud Computing", Recommendations of the National Institute of Standards and Technology. Special Publication 800-145, Sep. 2011. 7 pages.

*Primary Examiner* — Viva Miller
(74) *Attorney, Agent, or Firm* — Michael Purdham

(57) ABSTRACT

A computer-implemented method of assisting code review comprises updating a profile to indicate types of errors in a first code base based on a first code version history maintained by a code versioning system for the first code base. The first code version history is a record of changes made to the first code base. The method also includes receiving a second code base developed by a first developer having an association with the profile and displaying the second code base on a display together with assistance data based on the profile. The assistance data indicates focus areas for code review based on the types of errors identified in the profile.

19 Claims, 4 Drawing Sheets

(56) References Cited

U.S. PATENT DOCUMENTS

| | | | |
|---|---|---|---|
| 2013/0117400 A1* | 5/2013 | An | H04L 63/0823 |
| | | | 709/206 |
| 2014/0082430 A1* | 3/2014 | Bartlett | G06F 11/3055 |
| | | | 714/47.3 |
| 2015/0186193 A1* | 7/2015 | Jain | G06F 9/541 |
| | | | 719/328 |

* cited by examiner

USER PROFILE BASED CODE REVIEW

BACKGROUND

Code review is part of the software development life cycle. Code review enables developers to benefit from experience and knowledge of peers. It can help identify problems with design or implementation of a code before it is integrated into a production environment. However, due to inefficiencies in typical review processes, design and code errors can slip into the next stage of development. As errors move further in the development cycle, the cost associated with resolution of the error can increase.

SUMMARY

Embodiments of the disclosure provide a method, system, and computer program product for assisting code review. In one embodiment, the method comprises updating a profile to indicate types of errors in a first code base based on a first code version history maintained by a code versioning system for the first code base. The first code version history is a record of changes made to the first code base. The method also includes receiving a second code base developed by a first developer having an association with the profile and displaying the second code base on a display together with assistance data based on the profile. The assistance data indicates focus areas for code review based on the types of errors identified in the profile.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
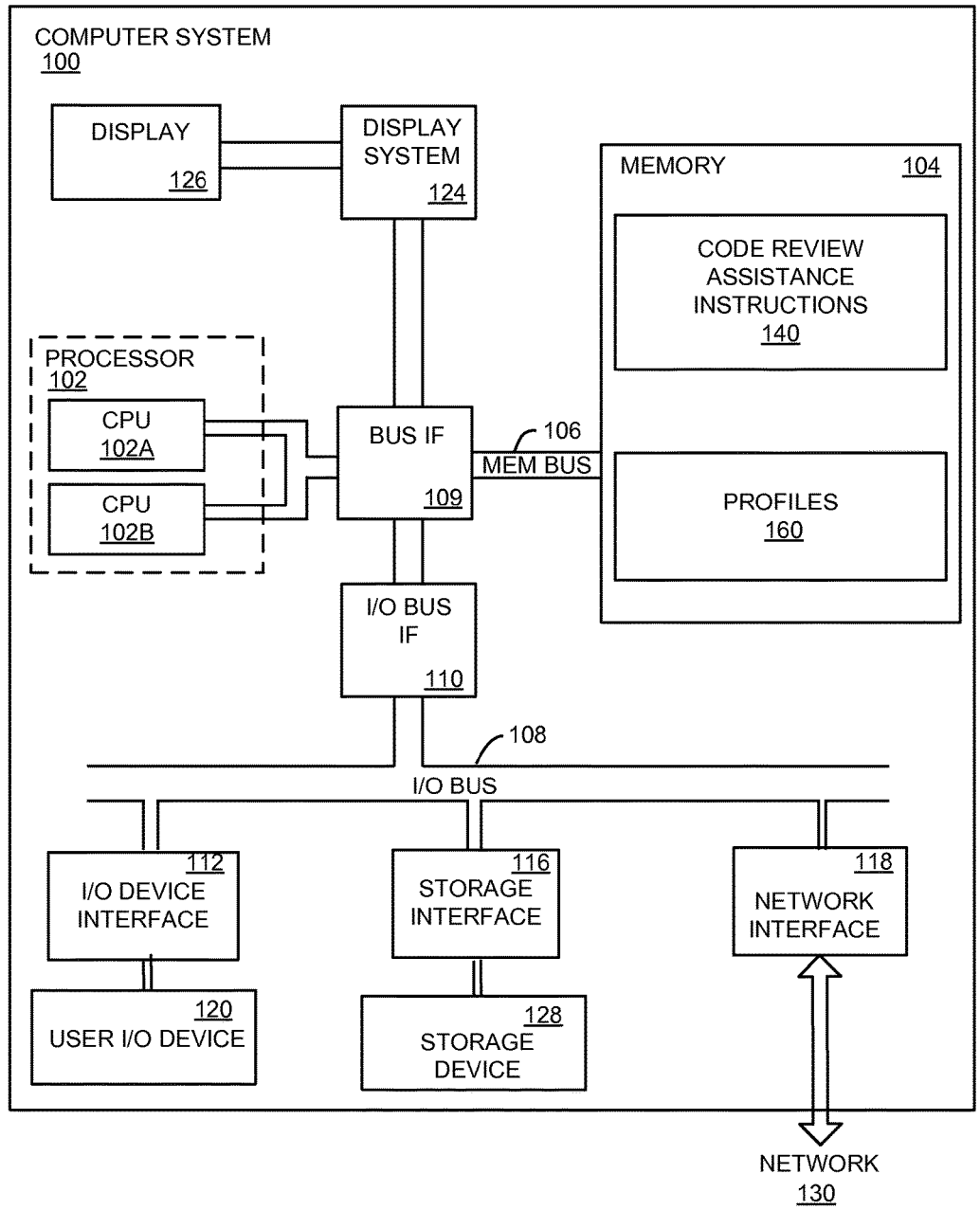
FIG. 1 is a high-level block diagram of one embodiment of an example computer system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

FIG. 1 is a high-level block diagram of one embodiment of an example computer system 100. The components of the computer system 100 shown in FIG. 1 include one or more processors 102, a memory 104, a storage interface 116, an Input/Output ("I/O") device interface 112, and a network interface 118, all of which are communicatively coupled, directly or indirectly, for inter-component communication via a memory bus 106, an I/O bus 108, bus interface unit ("IF") 109, and an I/O bus interface unit 110.

In the embodiment shown in FIG. 1, the computer system 100 also includes one or more general-purpose programmable central processing units (CPUs) 102A and 102B, herein generically referred to as the processor 102. In some embodiments, the computer system 100 contains multiple processors. However, in other embodiments, the computer system 100 is a single CPU system. Each processor 102 executes instructions stored in the memory 104.

In some embodiments, the memory 104 includes a random-access semiconductor memory, storage device, or storage medium (either volatile or non-volatile) for storing or encoding data and programs. For example, in this embodiment, the memory 104 stores code review assistance instructions 140 and profiles 160, each of which is described in more detail below. In some embodiments, the memory 104 represents the entire virtual memory of the computer system 100, and may also include the virtual memory of other computer systems coupled directly to the computer system 100 or connected via a network 130. In some embodiments, the memory 104 is a single monolithic entity, but in other embodiments, the memory 104 includes a hierarchy of caches and other memory devices. For example, the memory 104 can exist in multiple levels of caches, and these caches may be further divided by function, so that one cache holds instructions while another holds non-instruction data, which is used by the processor. The memory 104 may be further distributed and associated with different CPUs or sets of CPUs, as is known in any various so-called non-uniform memory access (NUMA) computer architectures, for example.

Hence, although the code review assistance instructions 140 and profiles 160 are stored on the same memory 104 in the example shown in FIG. 1 for purposes of explanation, it is to be understood that other embodiments can be implemented differently. For example, each of the code review assistance instructions 140 and profiles 160 can be stored on separate media in other embodiments. In addition, in some embodiments, the code review assistance instructions 140 and/or the profiles 160 can be distributed across multiple physical media.

Furthermore, in some embodiments, the code review assistance instructions 140 are executed by the same processor 102. However, in other embodiments, execution of the code review assistance instructions 140 is distributed across multiple processors located in the same or different computer systems. For example, in some such embodiments, at least a portion of the instructions and data structures associated with the code review assistance instructions 140 can be on different computer systems and accessed remotely, e.g., via a network 130. The computer system 100 can use virtual addressing mechanisms that allow the programs of the computer system 100 to behave as if they only have access to a large, single storage entity instead of access to multiple, smaller storage entities. Thus, the memory 104 can store all or a portion of the various programs, modules, and data structures for identifying and tracking sensitive data as discussed herein The computer system 100 in the embodiment shown in FIG. 1 also includes a bus interface unit 109 to handle communications among the processor 102, the memory 104, the display system 124, and the I/O bus interface unit 110. The I/O bus interface unit 110 is coupled with the I/O bus 108 for transferring data to and from the various I/O units.

In particular, the I/O bus interface unit 110 can communicate with multiple I/O interface units 112, 116, and 118, which are also known as I/O processors (IOPs) or I/O adapters (IOAs), through the I/O bus 108. The display system 124 includes a display controller, a display memory, or both. The display controller can provide video, audio, or both types of data to a display device 126. The display memory may be a dedicated memory for buffering video data. The display system 124 is coupled with the display device 126, such as a standalone display screen, computer monitor, television, a tablet or handheld device display, or another other displayable device. In some embodiments, the display device 126 also includes one or more speakers for rendering audio. Alternatively, one or more speakers for rendering audio may be coupled with an I/O interface unit. In alternate embodiments, one or more functions provided by the display system 124 are on board an integrated circuit that also includes the processor 102. In addition, in some embodiments, one or more of the functions provided by the bus interface unit 109 is on board an integrated circuit that also includes the processor 102.

The I/O interface units support communication with a variety of storage and I/O devices. For example, the I/O device interface unit 112 supports the attachment of one or more user I/O devices 120, which may include user output devices (such as a video display devices, speaker, fax machine, printer, and/or television set) and user input devices (such as a keyboard, mouse, keypad, touchpad, trackball, buttons, light pen, or other pointing devices). A user can manipulate the user input devices 120 using a user interface, in order to provide input data and commands to the user I/O device 120 and the computer system 100. Additionally, a user can receive output data via the user output devices. For example, a user interface may be presented via the user I/O device 120, such as displayed on a display device, played via a speaker, or printed via a printer.

The storage interface 116 supports the attachment of one or more disk drives or direct access storage devices 128 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 128 is implemented via any type of secondary storage device. The contents of the memory 104, or any portion thereof, may be stored to and retrieved from the storage device 128 as needed. The network interface 118 provides one or more communication paths from the computer system 100 to other digital devices and computer systems.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 includes different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100, can include multiple I/O bus interface units 110 and/or multiple I/O buses 108 in other embodiments. While multiple I/O interface units are shown, which separate the I/O bus 108 from various communication paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, or any other suitable type of electronic device. In addition, in some embodiments, the computer system 100 can be implemented within a cloud computer system, or using one or more cloud computing services. Consistent with various embodiments, a cloud computer system can include a network-based, distributed data processing system that provides one or more cloud computing services. In certain embodiments, a cloud computer system can include many computers, hundreds or thousands of them, disposed within one or more data centers and configured to share resources over the network. However, it is to be understood that cloud computer systems are not limited to those which include hundreds or thousands of computers and can include few than hundreds of computers. Some example cloud computing embodiments are discussed in more detail below. It is to be understood that although this disclosure includes a detailed description on cloud computing, implementation of the embodiments recited herein are not limited to a cloud computing environment.

As discussed above, in some embodiments, one or more of the components and data shown in FIG. 1 include instructions or statements that execute on the processor 102 or instructions or statements that are interpreted by instructions or statements that execute the processor 102 to carry out the functions as described herein. In other embodiments, one or more of the components shown in FIG. 1 are implemented in hardware via semiconductor devices, chips, logical gates, circuits, circuit cards, and/or other physical hardware devices in lieu of, or in addition to, a processor-based system.

In operation, the computer system 100 is configured to provide annotations and/or supplemental information to a code reviewer to assist the code review process. In particular, the code review assistance instructions 140 are configured to cause the processor 102 to create and/or update profiles which contain information based on past performance to help direct/focus the code review process, thereby improving the efficiency of the code review process. The profiles can be created for individual code developers and/or teams of code developers.

Furthermore, the code review assistance instructions 140 can be part of a code versioning system (CVS) or separate from a CVS. For example, as understood by one of skill in the art, a conventional CVS maintains a history of changes made to a code base or first version of code. Thus, for each line of code, the CVS maintains a revision history. Code versioning systems, such as, but not limited to, Gerrit Code Review, are known to one of skill in the art and not discussed in more detail herein. In some embodiments, the code review assistance instructions 140 are implemented as part of a CVS to provide the enhanced features described herein. In other embodiments, the code review assistance instructions 140 are implemented separately from a CVS and operate on data obtained from a CVS. For example, the data from a CVS can be accessed over the network 130 via the network interface 118 or from the storage device 128 via the storage interface 116 in some such embodiments.

As mentioned above, the code review assistance instructions 140 are configured, when executed by the processor 102, to develop a respective profile for each developer based on code analyzed in the past for the given developer. For example, when a developer delivers a first version of code (also referred to as base line code or code base), the CVS makes a note of changes to the code and maintains a history of changes, as discussed above. The history of changes includes the change in the code as well as the user which made the change and the time/date of the change.

Changes can be due to responding to a reported bug or defect, for example. Thus, in some embodiments, the code review assistance instructions 140 cause the processor 102 to perform a statistical analysis on the changes to the code, as indicated by the CVS, to identify the code segment or segments which caused the defect and, thereby, identify the type of mistake or error made by the given developer. In other embodiments, the statistical analysis to determine the type of mistake made is performed by a separate CVS and communicated to the code review assistance instructions 140. Alternatively, the code review assistance instructions 140 can be configured to classify or assign a type of error to a change based on user input received via the I/O device interface 112. For example, a user can indicate that a given error is an assignment error, code aesthetics, bad design, etc. In response to the user input, the code review assistance instructions 140 cause the processor 102 to assign the respective type of error to the changes noted by the CVS.

With each change in the code identified by the CVS, the code review assistance instructions 140 cause the processor 102 to update a respective developer profile to indicate the type of mistakes made by the respective developer. In some embodiments, the profile also includes a weight assigned to each type of mistake made by the respective developer. For example, if the same type of mistake is observed repeatedly, the code review assistance instructions 140 cause the processor 102 to adjust (e.g. increase or decrease) the weight assigned to respective types of errors or mistakes. For example, the processor 102 can increase the weight of a type of mistake observed repeatedly. In some embodiments, the weight is increased with each occurrence of the mistake. In other embodiments, the weight is increased after a predetermined number of occurrences. Additionally, if the same developer writes similar code in the future and does not make the same mistake that was previously observed, the weight for the given mistake is reduced, in some embodiments. An example profile indicating weights for various types of mistakes is shown in Table 1.

TABLE 1

Developer A Profile

| Type | Weight |
|---|---|
| Input Arguments | 5 |
| Assignments | 2 |
| Conditional Checks | 1 |

As shown in the example in Table 1, the profile for developer A includes 3 types of mistakes, each with a different weight. It is to be understood that the type of mistakes or errors shown in Table 1 are provided by way of example only. In particular, the types of errors or mistakes in a given profile depend on the technology being used. For example, the programming languages C, C++, assembly, java, etc. each have different types of mistakes which can be made.

In addition to, or in lieu of, creating and updating profiles for each individual developer, as discussed above, the code review assistance instructions 140 are configured to cause the processor 102 to create and update team profiles in some embodiments. A team profile includes mistakes made by members of the respective team. For example, for a team consisting of developers A, B, and C, the team profile includes the types of errors common to developers A, B, or C. In addition, in embodiments assigning weights, the weights can be determined based on the number of occurrences of the respective errors made the developers A, B, or C. The team profile can be used in addition to or in lieu of an individual developer profile. For example, if a new developer, who has not previously submitted code, submits code for review, a team profile can be used to assist the code review since there is no past code available to create an individual developer profile for the new developer.

The code review assistance instructions 140 are also configured to cause the processor 102 to output, for display on the display 126, the submitted code to be reviewed and assistance information based on the profile of the developer who submitted the code and/or assistance information based on a team profile associated with the developer who submitted the code. The assistance information is information that helps or assists a code reviewer in reviewing the code. The assistance information can include alphanumeric data from the respective profile, such as the types of errors made in the past as well as the frequency of such errors, the total number of times each type of error was made, the last time each type of error was made, etc. In some such embodiments, the alphanumeric assistance information is displayed in a section of the display 126.

In addition, in some embodiments, the assistance information includes text formatting applied to the code to be reviewed based on the developer and/or team profile in addition to or in lieu of the alphanumeric data discussed above. For example, the text formatting can include highlighting, underlining, font style, etc. For example, if the respective developer profile includes an input argument error, then the code review assistance instructions 140 causes the processing unit 102 to highlight displayed sections of the code to be reviewed that are relevant to input argument errors. Furthermore, in some embodiments, the color selected for the highlighting corresponds to a weight assigned to the respective error. Thus, each weight can be associated with a specific color, in some embodiments. For example, using the using the illustrative data from Table 1, sections relevant to input argument errors are highlighted a first color, sections of the code relevant to assignment errors are highlighted a second color, and section of the code relevant to conditional check errors are highlighted a third color, in some such embodiments, since the three types of errors have different weights in the example of Table 1.

By displaying assistance information based on developer and/or team profiles, the computer system 100 enables a code reviewer to focus on or be made aware of areas of concern based on past performance of the developer and/or team. Thus, the computer system 100 helps improve the efficiency of the code review process to locate and identify potential errors.

Figure 2:
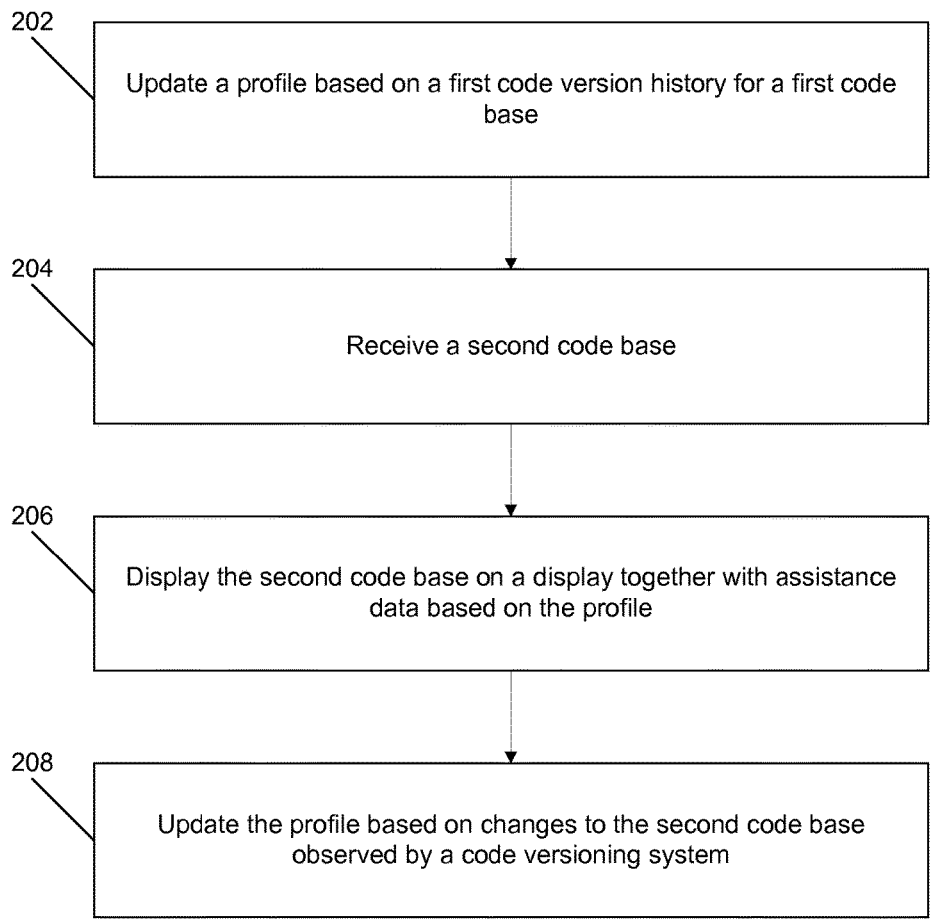
FIG. 2 is a flow chart depicting one embodiment of a method for assisting code review.

FIG. 2 is a flow chart depicting one embodiment of a method 200 for assisting code review. The method 200 can be implemented by a computer system such as computer system 100 discussed above. At block 202, the computer system updates a profile based on a first code version history maintained by a CVS for a first code base. As discussed above, a code version history is a record of changes made to a code base that is maintained or recorded by a CVS. Hence, updating the profile includes analyzing the code version history to identify the type or nature of errors made based on the changes to the first code base recorded by the CVS, in some embodiments. In other embodiments, the analysis to identify the type of errors is performed by a separate system and communicated to the computer system which updates the profile.

Furthermore, in some embodiments, updating the profile includes updating the profile with each change in the first code base detected by the CVS. In other embodiments, the profile is updated after a plurality of changes have been detected. In some embodiments, the profile includes an individual developer profile corresponding only to an individual developer which is responsible for the first code base. In other embodiments, the profile includes a team profile corresponding to a team of developers including the developer which is responsible for the first code base, as discussed above. Furthermore, in some embodiments, both an individual developer profile and a team profile can be updated and used.

Updating the profile can also include creating a new profile if a profile associated with the developer did not previously exist. Additionally, updating the profile can include increasing or decreasing respective weights for the types of errors detected, as discussed above. For example, if same type of error is observed repeatedly, the weight of that type of error is increased accordingly. Similarly, if a given type of error is not repeated, the weight of that type of error can be decreased accordingly. In addition, updating the profile can also include a manual update. That is, in some embodiments, the computer system can also update the profile based on received user input that indicates what updates are to be made to the profile. Such a manual update enables further refinement of the profile.

At block 204, a second code base is received. The second code base is developed by a developer having an association with the profile updated at block 202. In some embodiments, the association between the developer and the profile is that the profile is an individual developer profile for the developer. In other embodiments, the developer is associated with the profile based on membership in a team. In such embodiments, the developer is associated with a team profile, as discussed above. Hence, as used herein, a profile associated with a developer is not limited to an individual developer profile corresponding only to the single developer. Indeed, the profile need not contain prior information based on code developed by a developer in order to be associated with that developer. For example, as discussed above, a new developer on a team can be associated with a team profile based on membership on the team.

The developer can upload the second code base to the computer system for review by a review tool. In an alternative example, the computer system can retrieve the second code base in response to user input received from a code reviewer. At block 206, the second code base is displayed on a display together with assistance data based on the profile associated with the developer. As discussed above, the profile can be associated with only the developer and/or with a team to which the developer belongs. As discussed above, the assistance data can include alphanumeric text and/or non-alphanumeric text formatting, such as highlighting or underlining. Additionally, as discussed above, the color of the non-alphanumeric text formatting can vary based on weights assigned to each type of error.

In some embodiments, the text formatting is applied to changes in the second code base detected by the CVS. In some such embodiments, based on a change observed by the CVS, the computer system can determine that the type of change made. For example, if a change to input arguments is observed, the computer system can then check the profile to determine if input argument errors are listed in the profile and the corresponding weight, if any. If input argument errors are identified in the profile, the change to the input argument observed by the CVS can be highlighted, for example, based on the corresponding weight. In other embodiments, the second code base can be analyzed to identify segments of code related to different error types. The identified segments of code are then annotated (e.g. highlighted or underlined) based on the developer and/or team profile. For example, segments related to input arguments can be highlighted, whether or not changes have been made to the respective segments, based on the respective profile.

At block 208, the profile is updated based on changes to the second code base observed by the CVS. The profile can be updated as each change is observed in some embodiments. In other embodiments, the profile can be updated after a plurality of changes have been observed. Updating the profile can include increasing and decreasing weights associated with observed errors as well as including new observed errors and removing errors no longer observed. In this way, the profile continues to change to reflect the coding habits of an individual developer and/or the developer's team.

It is to be understood that the order in which the blocks described below are discussed is not to be construed as limiting the order in which the individual acts can be performed. In particular, the acts performed can be performed simultaneously or in a different order than that discussed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
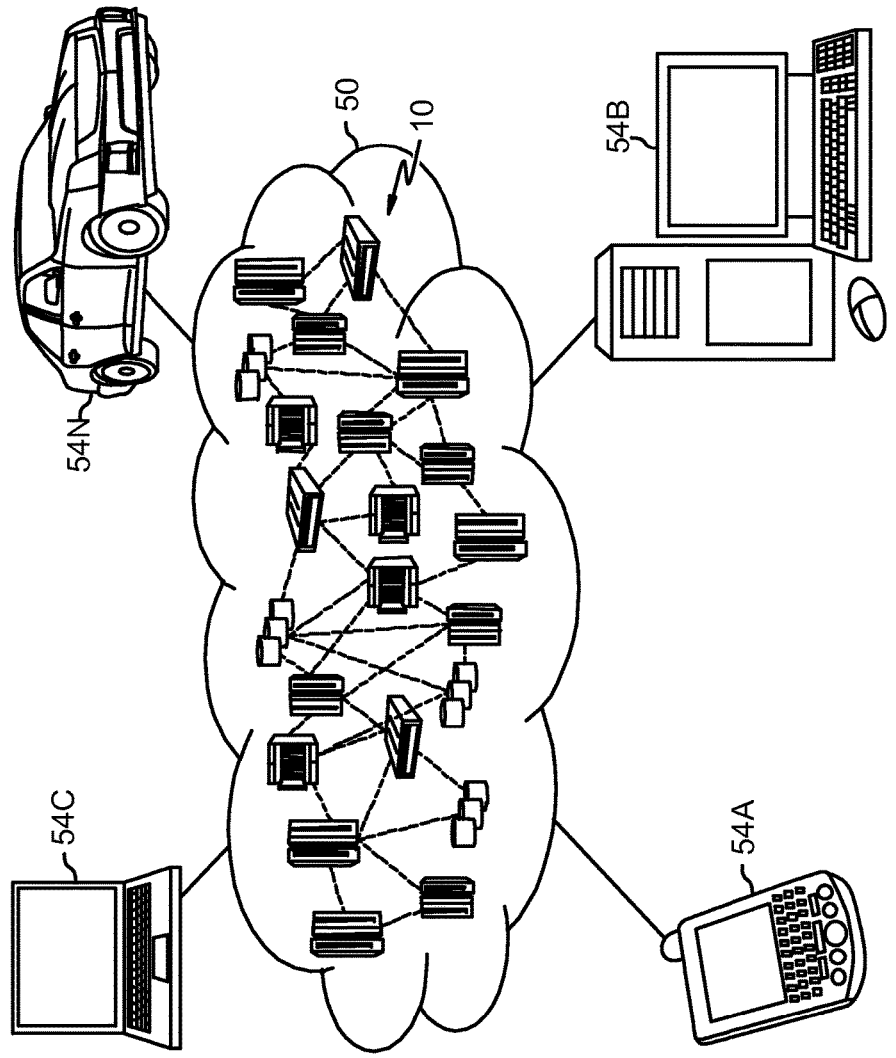
FIG. 3 depicts one embodiment of an example cloud computing environment.

Referring now to FIG. 3, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
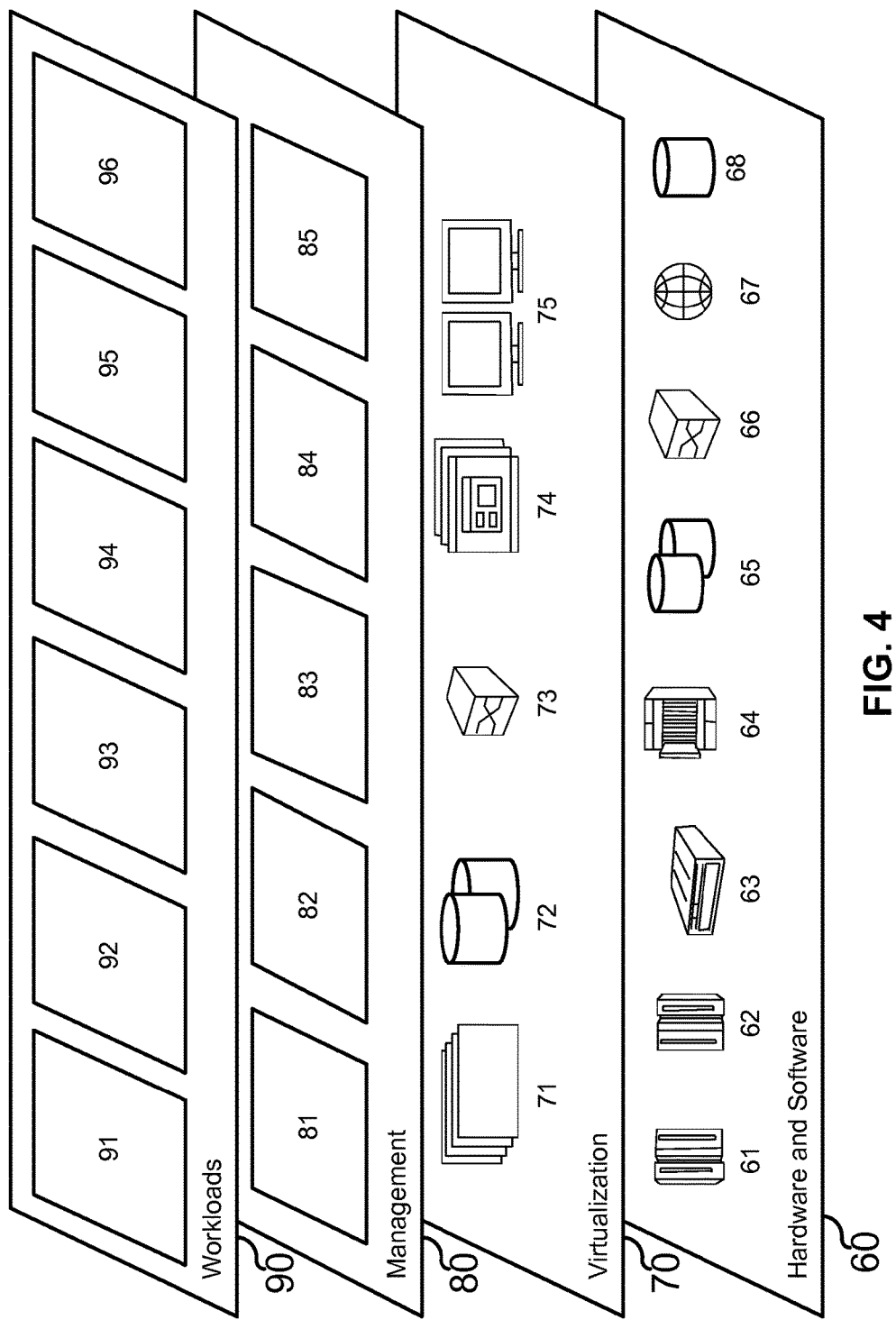
FIG. 4 depicts one embodiment of illustrative abstraction model layers.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and code review assistance processing 96. Code review assistance processing 96 is configured to perform one or more of the functions described above with respect to FIG. 1 and FIG. 2.

Example Embodiments

Example 1 includes a computer-implemented method of assisting code review. The method comprises updating a profile to indicate types of errors in a first code base based on a first code version history maintained by a code versioning system for the first code base, wherein the first code version history is a record of changes made to the first code base; receiving a second code base developed by a first developer having an association with the profile; and displaying the second code base on a display together with assistance data based on the profile, wherein the assistance data indicates focus areas for code review based on the types of errors identified in the profile.

Example 2 includes the method of Example 1, wherein the profile is at least one of a team profile associated with a plurality of developers including the first developer or an individual developer profile associated with only the first developer.

Example 3 includes the method of any of Examples 1 and 2, wherein the profile includes at least one of alphanumeric text or non-alphanumeric text formatting.

Example 4 includes the method of any of Examples 1-3, wherein the assistance data includes respective weights assigned to each type of error identified in the profile.

Example 5 include the method of Example 4, wherein displaying the second code base together with the assistance data comprises highlighting respective code sections that correspond to a respective one of the types of errors contained in the profile, wherein the respective color of each highlighted section is based on the weight assigned to the respective type of error.

Example 6 includes the method of any of Examples 1-5, further comprising updating the profile based on a second code version history maintained by the code versioning system for the second code base, wherein the second code version history is a record of changes made to the second code base.

Example 7 includes the method of Example 6, wherein updating the profile based on the second code version history includes adjusting weights assigned to each type of error identified in the profile.

Example 8 includes a program product comprising a processor-readable storage medium having program instructions embodied thereon, wherein the program instructions are configured, when executed by at least one programmable processor, to cause the at least one programmable processor to edit a profile to indicate types of errors in a first code base based on a first code version history maintained by a code versioning system for the first code base, wherein the first code version history is a record of changes made to the first code base; receive a second code base developed by a first developer having an association with the profile; output the second code base for display on a display; and output instructions for displaying assistance data with the second code base on the display, wherein the assistance data indicates types of errors identified in the profile associated with the first developer.

Example 9 includes the program product of Example 8, wherein the profile is one of a team profile associated with a plurality of developers including the first developer or an individual developer profile associated with only the first developer.

Example 10 includes the program product of any of Examples 8-9, wherein the assistance data includes at least one of alphanumeric text or non-alphanumeric text formatting.

Example 11 includes the program product of any of Examples 8-10, wherein the profile includes respective weights assigned to each type of error identified in the profile.

Example 12 includes the program product of Example 11, wherein the program instructions are further configured to cause the at least one programmable processor to highlight respective code sections of the second code base that reflect respective types of errors identified in the profile, wherein the respective color of each highlighted section is based on the weight assigned to the respective type of error.

Example 13 includes the program product of any of Examples 8-12, wherein the program instructions are further configured to cause the at least one programmable processor to update the profile based on a second code version history maintained by the code versioning system for the second code base, wherein the second code version history is a record of changes made to the second code base.

Example 14 includes the program product of Example 13, wherein the program instructions are further configured to cause the at least one programmable processor to adjust weights assigned to each type of error identified in the profile based on the second code version history.

Example 15 includes a computer system comprising a display; a memory configured to store a profile; and a processing unit communicatively coupled to the display and to the memory. The processing unit is configured to modify the profile based on types of errors in a first code base indicated by a first code version history maintained by a code versioning system for the first code base, the first code version history being a record of changes made to the first code base. The processing unit is further configured to output a second code base developed by a first developer having an association with the profile to the display and to output instructions to the display for displaying assistance data with the second code base, wherein the assistance data indicates types of errors identified in the profile.

Example 16 includes the computer system of Example 15, wherein the profile is at least one of a team profile associated with a plurality of developers including the first developer or an individual developer profile associated with only the first developer.

Example 17 includes the computer system of any of Examples 15-16, wherein the assistance data includes at least one of alphanumeric text or non-alphanumeric text formatting.

Example 18 includes the computer system of any of Examples 15-17, wherein the processing unit is configured to output instructions to the display to highlight respective code sections of the second code base that reflect respective types of errors identified in the profile.

Example 19 includes the computer system of Example 18, wherein the respective color of each highlighted section is based on a weight assigned to the respective type of error.

Example 20 includes the computer system of any of Examples 15-19, wherein the processing unit is configured to update the profile based on a second code version history maintained by the code versioning system for the second code base, wherein the second code version history is a record of changes made to the second code base.

Although specific embodiments have been illustrated and described herein, it will be appreciated by those of ordinary skill in the art that any arrangement, which is calculated to achieve the same purpose, may be substituted for the specific embodiments shown.

What is claimed is:

1. A computer-implemented method of assisting code review, the method comprising:
   identifying, using statistical analysis, types of code errors in a first code base based on a first code version history maintained by a code versioning system for the first code base, wherein the first code version history is a record of changes made to the first code base;
   updating a profile to indicate the identified types of code errors in the first code base;

receiving a second code base developed by a first developer having an association with the profile;
detecting one or more changes in the second code base;
creating assistance data based on the profile and the one or more changes, wherein the assistance data indicates focus areas for a code review based on the types of code errors identified in the profile and includes respective weights assigned to each type of code error identified in the profile wherein the respective weights assigned to each type of error identified in the profile are based on respective number of occurrences of each type of error and the last time each type of error was made;
displaying the second code base on a display together with the assistance data; and
updating the profile based on each change in the second code base observed through monitoring the second code base for changes during the code review of the second code base.

2. The method of claim 1, wherein the profile is at least one of a team profile associated with a plurality of developers including the first developer or an individual developer profile associated with only the first developer.

3. The method of claim 1, wherein the profile includes at least one of alphanumeric text or non-alphanumeric text formatting.

4. The method of claim 1, wherein displaying the second code base together with the assistance data comprises highlighting respective code sections that correspond to a respective one of the types of errors contained in the profile, wherein the respective color of each highlighted section is based on the weight assigned to the respective type of error.

5. The method of claim 1, wherein the updating the profile based on one or more changes in the second code base is based on a second code version history maintained by the code versioning system for the second code base, wherein the second code version history is a record of changes made to the second code base.

6. The method of claim 5, wherein updating the profile based on the second code version history includes adjusting weights assigned to each type of error identified in the profile.

7. A program product comprising a processor-readable storage medium having program instructions embodied thereon, wherein the program instructions are configured, when executed by at least one programmable processor, to cause the at least one programmable processor to:
identify, using statistical analysis, types of code errors in a first code base based on a first code version history maintained by a code versioning system for the first code base, wherein the first code version history is a record of changes made to the first code base;
edit a profile to indicate the identified types of code errors in the first code base;
receive a second code base developed by a first developer having an association with the profile;
output the second code base for display on a display;
detect one or more changes in the second code base;
create assistance data based on the profile and the one or more changes, wherein the assistance data indicates focus areas for a code review based on the types of code errors identified in the profile associated with the first developer and includes respective weights assigned to each type of code error identified in the profile wherein the respective weights assigned to each type of error identified in the profile are based on respective number of occurrences of each type of error and the last time each type of error was made;
display the second code base on a display together with the assistance data; and
update the profile based on one or more changes in the second code base observed through monitoring the second code base for changes during the code review of the second code base.

8. The program product of claim 7, wherein the profile is one of a team profile associated with a plurality of developers including the first developer or an individual developer profile associated with only the first developer.

9. The program product of claim 7, wherein the assistance data includes at least one of alphanumeric text or non-alphanumeric text formatting.

10. The program product of claim 7, wherein the program instructions are further configured to cause the at least one programmable processor to highlight respective code sections of the second code base that reflect respective types of errors identified in the profile, wherein the respective color of each highlighted section is based on the weight assigned to the respective type of error.

11. The program product of claim 7, wherein the update of the profile based on one or more changes in the second code base is based on a second code version history maintained by the code versioning system for the second code base, wherein the second code version history is a record of changes made to the second code base.

12. The program product of claim 11, wherein the program instructions are further configured to cause the at least one programmable processor to adjust weights assigned to each type of error identified in the profile based on the second code version history.

13. A computer system comprising:
a display;
a memory configured to store a profile; and
a processing unit communicatively coupled to the display and to the memory;
wherein the processing unit is configured to:
identify, using statistical analysis, types of code errors in a first code base indicated by a first code version history maintained by a code versioning system for the first code base, the first code version history being a record of changes made to the first code base;
modify the profile based on the identified types of code errors in the first code base;
receive a second code base developed by a first developer having an association with the profile;
detect one or more changes in the second code base;
create assistance data based on the profile and the one or more changes, wherein the assistance data indicates focus areas for a code review based on the types of code errors identified in the profile and includes respective weights assigned to each type of code error identified in the profile wherein the respective weights assigned to each type of error identified in the profile are based on respective number of occurrences of each type of error and the last time each type of error was made;
display the second code base on a display together with the assistance data; and
updating the profile based on one or more changes in the second code base observed through monitoring the second code base for changes during the code review of the second code base.

14. The computer system of claim 13, wherein the profile is at least one of a team profile associated with a plurality of developers including the first developer or an individual developer profile associated with only the first developer.

15. The computer system of claim 13, wherein the assistance data includes at least one of alphanumeric text or non-alphanumeric text formatting.

16. The computer system of claim 13, wherein the processing unit is configured to output instructions to the display to highlight respective code sections of the second code base that reflect respective types of errors identified in the profile.

17. The computer system of claim 16, wherein the respective color of each highlighted section is based on a weight assigned to the respective type of error.

18. The computer system of claim 13, wherein the update of the profile based on one or more changes in the second code base is based on a second code version history maintained by the code versioning system for the second code base, wherein the second code version history is a record of changes made to the second code base.

19. The method of claim 1, wherein the profile is a team profile associated with a plurality of developers including the first developer;
   wherein the team profile does not contain information based on code developed by the first developer; and
   wherein the team profile includes the number of occurrences of errors made the plurality of developers.

* * * * *